July 28, 1936.  C. R. HUBBARD  2,049,063
MACHINERY PACKING
Filed Sept. 13, 1935
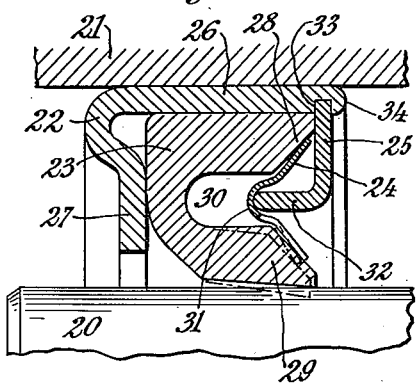
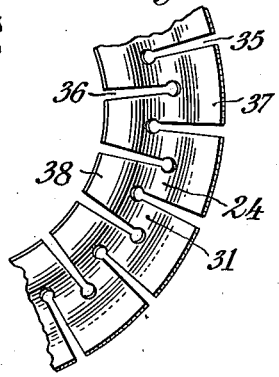
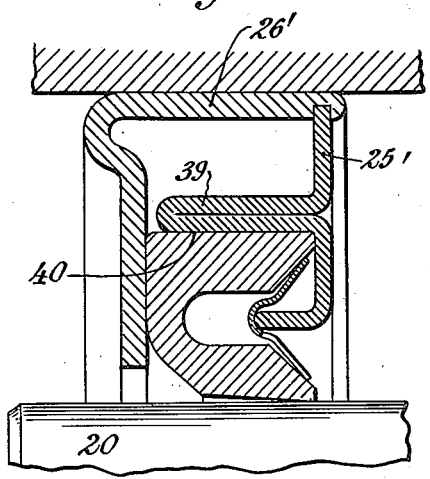
INVENTOR
Cecil Robert Hubbard,
BY
Fraser, Myers & Manley
ATTORNEYS.

Patented July 28, 1936

2,049,063

UNITED STATES PATENT OFFICE 2,049,063

MACHINERY PACKING

Cecil R. Hubbard, Palmyra, N. Y., assignor to The Garlock Packing Company, Palmyra, N. Y., a corporation of New York Application September 13, 1935, Serial No. 40,360
In Canada January 2, 1935

5 Claims. (Cl. 288—1)

This application has been filed in Canada January 2, 1935.

This invention relates to improvements in machinery packing adapted for use either in the sealing of joints against fluid pressure or as a means of preventing the escape of lubricant and the entrance of dust and other foreign matter at the joint between relatively movable parts of a machine, as at a lubricated bearing.

The invention as herein disclosed is applied to a packing or oil-sealing device of the above-described character comprising a relatively rigid housing element having a cylindrical portion and an annular restraining flange within which is mounted a flexible sealing ring having an annular portion in contact with the restraining flange and a pair of spaced marginal sealing lips separated by an annular recess in the face of the ring which is directed away from the restraining flange. A resilient expanding ring of trough-like cross-sectional form is nested in the recess of the sealing ring with its marginal portions in contact with the undercut portions of the sealing lips, and a retaining ring mounted in the housing element along the side of the sealing ring opposite the restraining flange serves as the means whereby the sealing ring and the expanding ring are held in their assembled relations with each other in the housing.

The invention herein claimed is characterized, as compared with analogous devices of the prior art, in that the expanding ring has an annular groove intermediate its marginal portions extending into the recess in the sealing ring, and the retaining ring has a substantially cylindrical lip along its free edge, the lip being extended into the grooved portion of the expanding ring and being of dimensions such as to hold the expanding ring flexed between the lips of the sealing ring and the lip of the retaining ring.

Somewhat more specifically considered, the invention is further characterized in that the retaining ring has a cylindrical element spaced from the cylindrical portion of the housing element and extending towards the restraining flange to serve as a seat for one of the cylindrical surfaces of the sealing ring, and, if desired, this cylindrical element may comprise a portion of the retaining ring, intermediate its marginal portions, folded on itself and extending at right angles with respect to the immediately adjacent portions thereof.

In the accompanying drawing illustrating preferred forms of the invention—

Figure 1 is a cross-sectional view through a packing or oil-sealing device embodying the invention and adjacent portions of relatively movable parts of a machine to which the packing is illustrated as having been applied;

Fig. 2 is a corresponding view of a packing or oil-sealing device embodying the invention in modified form and adjacent portions of a machine to which the packing is illustrated as having been applied; and Fig. 3 is a face view of a portion of a resilient expanding ring such as is used as a part of the packing illustrated by Figs. 1 and 2.

In Fig. 1 of the drawing the invention is illustrated as applied to a rotatable shaft 20 mounted for rotation within a bore 21. The packing or oil-sealing device comprises a relatively rigid housing element 22, a flexible sealing element 23, a resilient expanding ring 24, and a retaining ring 25.

The housing element may, as illustrated, comprise a cylindrical portion 26, the external surface of which should make oil-tight contact with the inner surface of the bore 21, and an annular flange 27 having a portion at least disposed substantially at right angles with respect to the cylindrical portion 26 so as to serve as a restraining element for the sealing ring 23.

The sealing ring may have its external surface in close contact with the inner surface of the cylindrical portion 26 of the housing and its inner surface in close contact with the external surface of the shaft 20.

In order that the sealing ring may be permanently effective, it should preferably be of a form such as to provide a pair of spaced marginal sealing lips 28, 29, separated by an annular recess 30 in the face of the ring directed away from the restraining flange 27.

The cross-sectional dimensions of the sealing ring should preferably be such that the ring will normally tend to be of a radial depth greater than that of the space within which it is intended for use, so that it will be held flexed between the two relatively movable machine elements the joint between which it is intended to seal.

The effectiveness of the sealing element may be enhanced by the use of the flexible expander ring 24, a part of which is illustrated in detail in Fig. 3. This expander ring may comprise an annulus of relatively thin, flexible metal. It may be of trough-like cross-sectional form so as to lie fairly snugly within the recessed portion of the sealing ring 23 with its marginal portions in contact with the undercut surfaces of the lips 28, 29. Preferably the inclination of the marginal portions of the expander ring should be slightly greater than the inclination of the undercut surfaces of the lips of the sealing ring in order that the contact between the two rings may be localized near the edges of the sealing ring.

It is an important feature of the invention that the expander ring 24 has an annular groove or depression 31 intermediate its marginal portions and that the retaining ring 25 has a substantially cylindrical, inwardly-turned lip 32, the proportions and dimensions of the retaining ring being such that the lip 32 will engage the grooved portion 31 of the expander ring and hold the expander ring flexed with its marginal portions compressed against the undercut surface portions of the lips 28, 29, thus constantly tending to expand the lips of the sealing ring and hold them in close sealing contact with the opposed surfaces of the parts between which the ring is mounted. The retaining ring 25 may be secured in the housing ring 22 by placing its peripheral portion against a shoulder 33 provided therefor and then rolling over the marginal portion 34 of the housing ring so as to firmly secure the two elements together. The inturned lip 32 of the retaining ring and the groove or depression 31 in the expander ring are of importance in that they serve as a satisfactory means of maintaining the expander ring in its intended position with respect to the sealing ring with its outer marginal portion free from contact with the retaining ring. The contact between the retaining ring and the expander ring is localized along a zone substantially midway between the marginal portions of the expander ring, so that the resilient fingers of the expander ring, hereinafter to be described, may be free to act independently against the lips of the sealing ring.

As best represented in Fig. 3, the expander ring 24 may have its opposite marginal portions severed or notched as at 35, 36, so as to produce intervening resilient fingers 37, 38.

The modified form of packing or oil-sealing device illustrated by Fig. 2 differs from that illustrated by Fig. 1 in that the confining ring 25' has an inwardly-turned, marginal fold 39 in spaced relation with the outer cylindrical element 26' of the housing, so as to provide a seat 40 for the sealing ring at a material distance from the surface of the part of the housing which is mounted in fluid-tight relationship with a machine element. This form of device makes it possible to seal joints between machine elements of varying dimensions without varying the size of the sealing ring.

It is, of course, not essential that the herein-disclosed packing or oil-sealing device be mounted in fixed relation with respect to the outer machine element and in frictional relation with respect to the inner machine element. Were the outer element to be the one intended to rotate and the inner one intended to be fixed, it might be preferable to secure the housing to the inner element and permit the sealing ring to have frictional contact with the outer element. The invention has been disclosed as applied to the form which is likely to be most often met with in practice; but, as has been explained, is quite general in its application and may be used to seal joints between relatively movable parts whether the movement be rotary or reciprocative.

What I claim is:

1. A machinery packing comprising a relatively rigid housing element having a cylindrical portion, and an annular restraining flange; a flexible sealing ring having a cylindrical outer surface, an annular portion in contact with the restraining flange, and a pair of spaced marginal sealing lips separated by an annular recess in that one of its faces which is directed away from the restraining flange; a resilient expanding ring of trough-like cross-sectional form nested in the recess of the sealing ring with its marginal portions in contact with the undercut portions of the sealing lips, and having an annular groove intermediate its marginal portions extending into the recess; and a retaining ring mounted in the housing element along the side of the sealing ring opposite the restraining flange, the packing being characterized in that the retaining ring has a substantially cylindrical lip along its free edge, the lip being extended into the grooved portion of the expanding ring and being of dimensions such as to hold the expanding ring flexed between the lips of the sealing ring and the lip of the retaining ring, and in that the retaining ring has a cylindrical element spaced from the cylindrical portion of the housing element and extending towards its restraining flange so as to serve as a seat for the cylindrical surface of the sealing ring.

2. A machinery packing substantially as defined by claim 1, in which a portion of the retaining ring is folded upon itself at right angles to the immediately adjacent marginal portions thereof to form the cylindrical element intended to serve as a seat for the cylindrical outer surface of the sealing ring.

3. A machinery packing comprising a relatively rigid housing having a cylindrical portion and an annular restraining flange; a flexible sealing ring having a cylindrical outer surface, an annular portion in contact with the restraining flange, and a marginal sealing lip separated from the body of the ring by an annular recess in that one of its faces which is directed away from the restraining flange; a resilient expanding ring of trough-like cross-sectional form nested in the recess of the sealing ring with its resilient marginal portions in contact with the undercut portion of the sealing lip; and a retaining ring mounted in the housing element along the side of the sealing ring opposite the restraining flange, said retaining ring having a cylindrical element spaced from the cylindrical portion of the housing element and extending towards its restraining flange so as to serve as a seat for the cylindrical outer surface of the sealing ring, and having another portion which is adapted to engage the expanding ring and hold the latter flexed against the sealing lip.

4. A machinery packing comprising a relatively rigid housing having a cylindrical portion and an annular restraining flange; a flexible sealing ring having a cylindrical outer surface, an annular portion in contact with the restraining flange, and also having a marginal sealing lip; a resilient expanding ring having a marginal portion thereof in contact with the lip of the sealing ring, and a retaining ring mounted in the housing element along the side of the sealing ring opposite the restraining flange and adapted to hold the expanding ring flexed against the sealing lip, the packing being characterized in that the retaining ring has a cylindrical element spaced from the cylindrical portion of the housing element and substantially concentric to the latter so as to serve as a seat for the cylindrical outer surface of the sealing ring.

5. A machinery packing comprising a relatively rigid housing having a cylindrical portion and an annular restraining flange; a flexible sealing ring having a cylindrical outer surface, an annular portion in contact with the restraining flange, and also having a marginal sealing lip; a resilient expanding ring having a marginal portion thereof in contact with the lip of the sealing ring; and a retaining ring mounted in the housing element along the side of the sealing ring opposite the restraining flange and adapted to hold the expanding ring flexed against the sealing lip, the packing being characterized in that a portion of the retaining ring is folded upon itself substantially at right angles to the immediately adjacent marginal portions thereof to form a cylindrical element spaced from the cylindrical portion of the housing element and substantially concentric to the latter so as to serve as a seat for the cylindrical surface of the sealing ring.

CECIL R. HUBBARD.